United States Patent [19]
Wang

[11] Patent Number: 5,799,557
[45] Date of Patent: Sep. 1, 1998

[54] VENETIAN BLIND CUTTING MACHINE

[76] Inventor: Cherng-Fa Wang, 5F-23, No. 70, Fu Hsing Road, Tao Yuan, Taiwan

[21] Appl. No.: 820,543

[22] Filed: Mar. 19, 1997

[51] Int. Cl.$^6$ .................................................. B23D 23/00
[52] U.S. Cl. .......................... 83/639.5; 29/24.5; 83/452; 83/471.1; 83/517
[58] Field of Search .................. 83/375, 746, 750, 83/751, 452, 516, 577, 519, 618, 639.5, 648, 39, 627, 471.1, 167, 620, 622; 29/24.5

[56] References Cited

U.S. PATENT DOCUMENTS

| | | | |
|---|---|---|---|
| 4,275,628 | 6/1981 | Greenhouse | 83/622 |
| 4,790,226 | 12/1988 | Tsuchida | 83/949 |
| 4,819,530 | 4/1989 | Huang | 83/39 |
| 4,993,131 | 2/1991 | Graves et al. | 29/24.5 |
| 5,022,296 | 6/1991 | Eschauzier et al. | 83/60 |
| 5,056,388 | 10/1991 | Dekker et al. | 83/666 |
| 5,333,365 | 8/1994 | Marocco et al. | 83/562 |
| 5,339,716 | 8/1994 | Sands et al. | 83/452 |
| 5,456,149 | 10/1995 | Eisenheimer et al. | 29/24.5 |

*Primary Examiner*—Maurina T. Rachuba
*Attorney, Agent, or Firm*—David E. Dougherty

[57] ABSTRACT

A venetian blind cutting machine including a support framework, a cutter module replaceably mounted on a top of the support framework, two air cylinders for driving cutters mounted in the cutter module, two sets of quick couplings for connecting the air cylinders to an upper cutter, a strip cutter, and a lower cutter mounted in a cutter seat of the cutter module, a blind supporter pivotally connected to the support framework in front of the cutter module for stably supporting a venetian blind to be cut, and a blind locating assembly fixedly mounted behind the cutter module for adjustably deciding the length of the venetian blind to extend into the cutter module for cut. With the cutter module containing three cutters for an upper rail, strips, and a lower rail of the venetian blind and the two air cylinders connected to the cutters via the quick couplings, the cutters can be driven by the air cylinders to neatly cut the rails and strips of the blind by only one cut. Moreover, a different cutter module can be quickly replaced to cut venetian blind having differently shaped rails and strips.

2 Claims, 7 Drawing Sheets

VENETIAN BLIND CUTTING MACHINE

BACKGROUND OF THE INVENTION

The present invention relates to a cutting machine, and more particularly to a venetian blind cutting machine which may cut the upper and the lower rails and the strips of the blind to a desired length by only one cut.

Generally, a venetian blind is made and cut to order. For a window having special dimensions or shape, longer upper and lower rails and strips must be used and cut to the desired length. To do so, it is generally to cut the strips one by one with a pair of specific scissors. This is, of course, time and labor consuming, and it fails to produce a uniform cut edge for all the strips. Moreover, the scissors is useless in cutting the upper and the lower rails. There are many cutting machines developed to cut the rails and the strips, but all these machines have complicate structure and numerous parts. And, it is very inconvenient when changing cutters to cut different types of blinds.

It is therefore tried by the inventor to develop a new cutting machine for cutting venetian blinds to eliminate the drawbacks existed in the conventional blind cutting machines.

SUMMARY OF THE INVENTION

A primary object of the present invention is to provide a venetian blind cutting machine which has simple struction and can be used to cut the strips and the rails of the blind to a desired length by only one cut to produce uniform cut edges on the rails and the strips.

Another object of the present invention is to provide a venetian blind cutting machine which is so designed that the cutter module thereof can be easily and quickly replaced with other modules. The time required to replace the module is reduced and the productivity can be increased with the present invention.

DETAILED DESCRIPTION OF THE PREFERRED EMBODIMENTS

Figure 1:
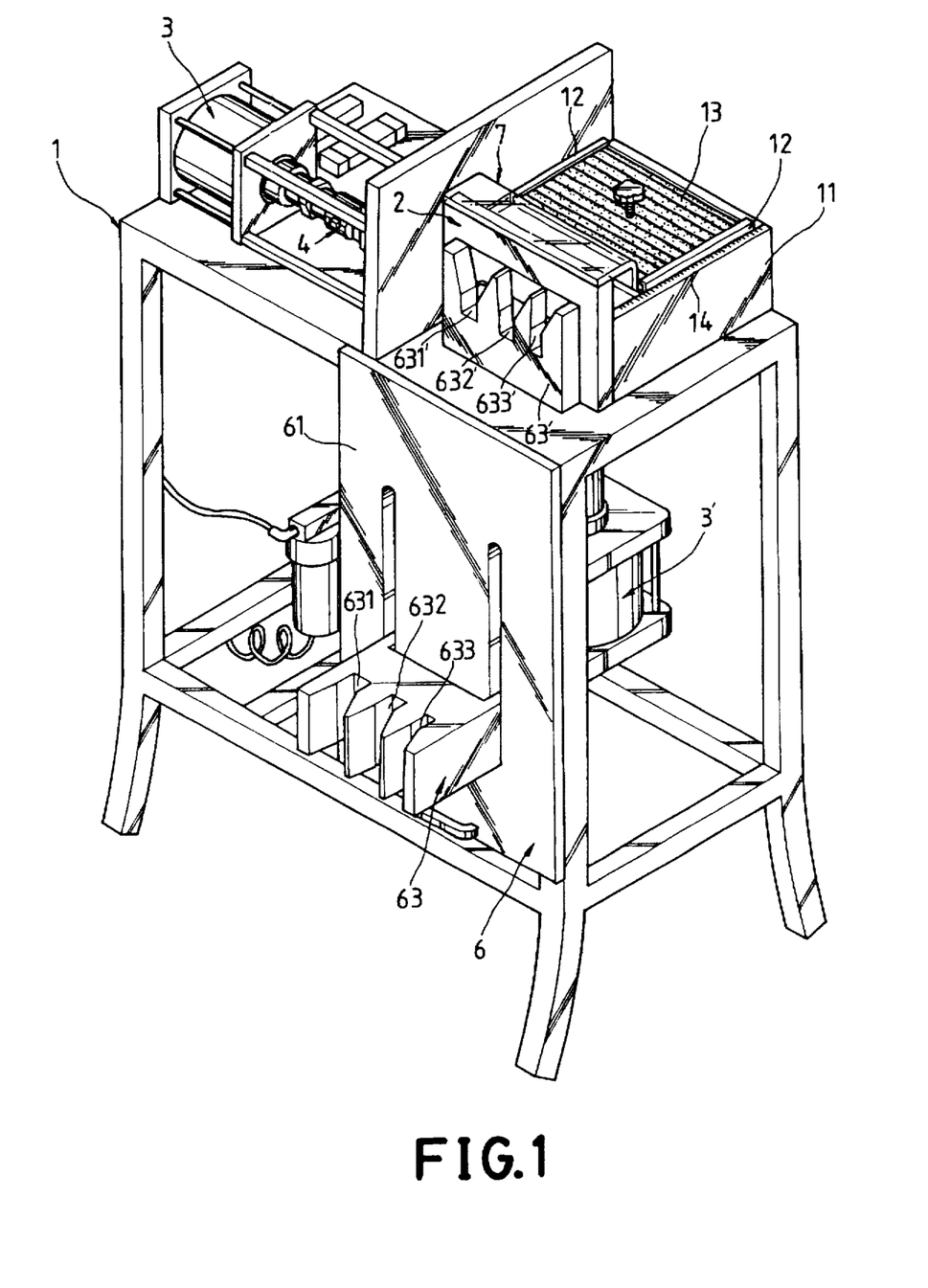
FIG. 1 is a perspective of the venetian blind cutting machine according to the present invention.
Figure 2:
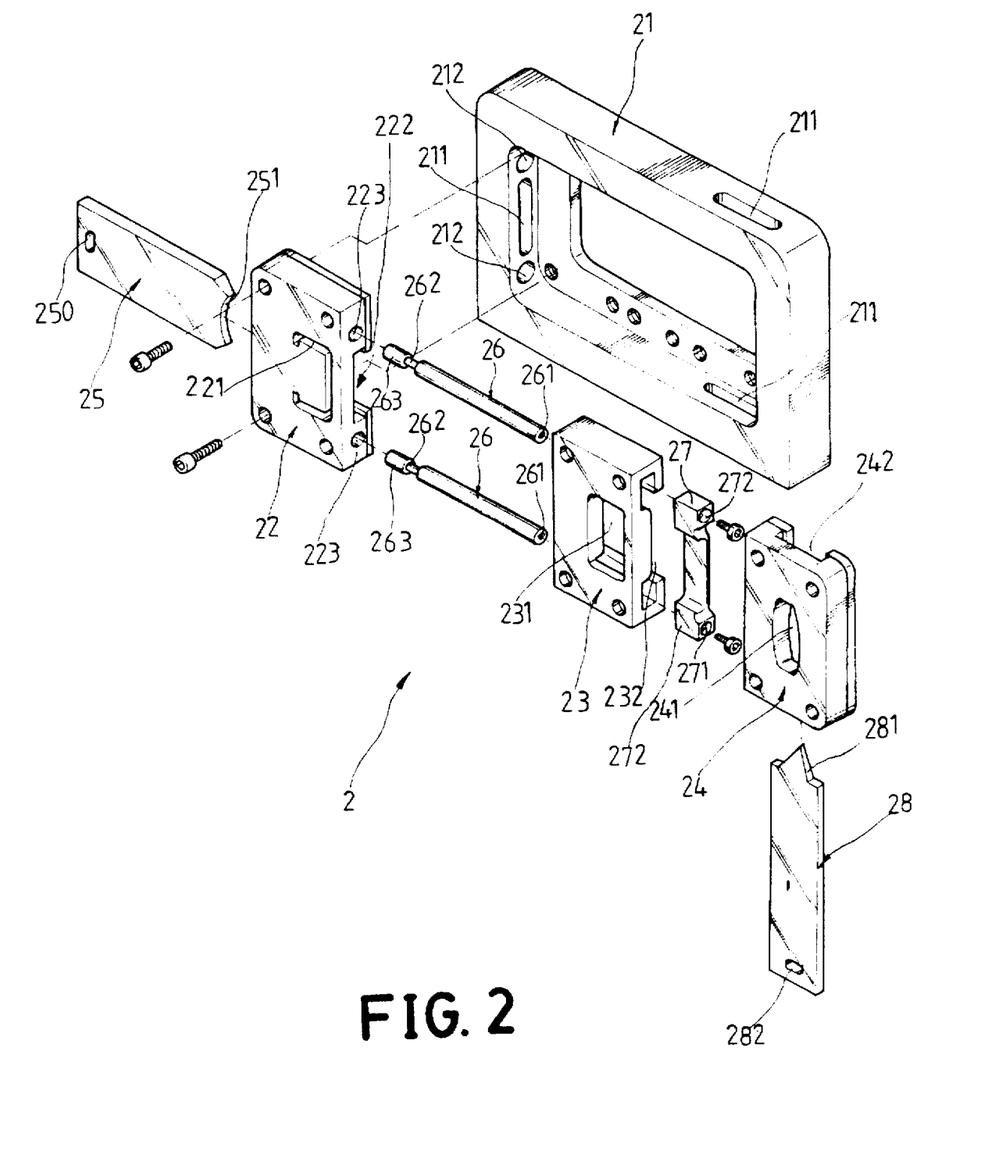
FIG. 2 is an exploded perspective of the cutter module of the present invention.
Figure 7:
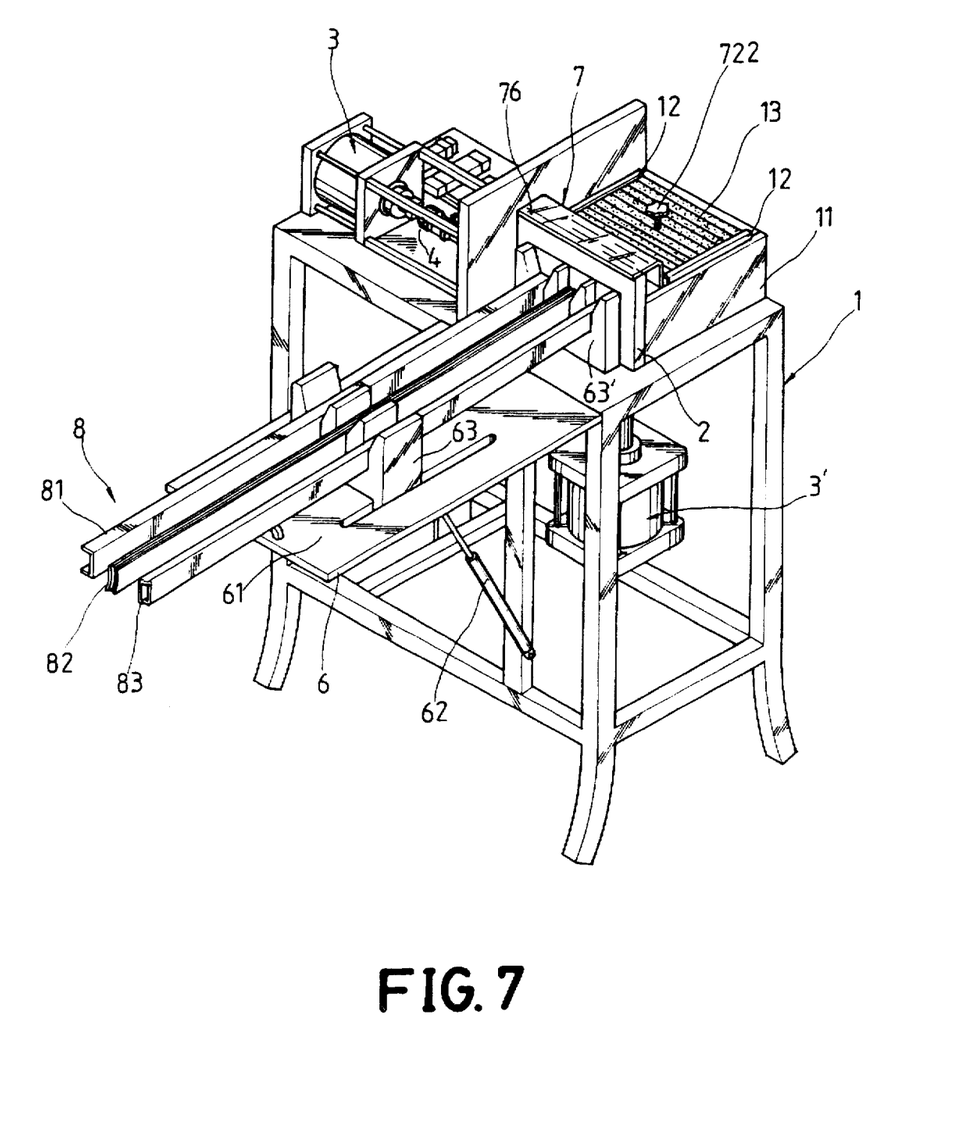
FIG. 7 is a perspective showing the present invention in use.

Please refer to FIGS. 1, 2 and 7. The present invention mainly includes a support framework 1, a cutter module 2 replaceably mounted on a top of the support framework 1, two air cylinders 3 and 3' for driving cutters mounted in the cutter module 2, two sets of quick couplings 4 and 4' for connecting the air cylinders 3 and 3', respectively, to the cutter module 2, a blind supporter 6 pivotally connected to the framework 1 in front of the cutter module 2, and a blind locating assembly 7 fixedly mounted behind the cutter module 2.

The cutter module 2 includes a cutter seat 21 into which an upper rail cutter holder 22, a strip cutter holder 23, and a lower rail cutter holder 24 are mounted by means of screws. An upper rail cutter 25, two push links 26, a strip cutter 27, and a lower rail cutter 28 are received in the cutter holders 22, 23 and 24 in a manner which will be described in details later.

The upper rail cutter holder 22 is formed with a cutting slot 221 which has a shape the same as a cross section of an upper rail 81 of a venetian blind 8 to be cut, a sliding channel 222 transversely extended across a backside of the cutter holder 22 and at a height and in a width corresponding to that of the cutting slot 221 for guiding the upper rail cutter 25, and two through holes 223 transversely extended across two ends of the cutter holder 22 for guiding the push links 26.

The strip cutter holder 23 is formed with a cutting slot 231 for blind strips 82 to pass through for cutting, a sliding channel 232 transversely extended across a backside of the cutter holder 23 for guiding the strip cutter 27.

The lower rail cutter holder 24 is formed with a cutting slot 241 which has a shape the same as a cross section of a lower rail 83 of the blind 8 to be cut, and a sliding channel 242 vertically extended through a backside of the cutter holder 24 for guiding the lower rail cutter 28.

The upper rail cutter 25 is a flat member having a front side (that is, a side pointing toward the upper rail to be cut) serving as a cutting blade 251 which has two inward inclined shoulder portions and a backward curved cutting portion between the two shoulders, forming two pointed edges at joints of the shoulder portions with the curved cutting portion. The upper rail cutter 25 has a rear side on which a retaining hole 252 is formed.

The push link 26 each is a round bar having a front end (that is, an end pointing toward the strips to be cut) provided with an internally threaded hole 261 and a rear end forming a stop end 263 and a reduced-diameter section 262 in front of the stop end 263.

The strip cutter 27 is a member having a front side (that is, a side facing toward the strips to be cut) forming a middle cutting blade portion 271. The strip cutter 27 has two expanded ends each formed with a through hole 272. Openings of the through holes 272 at the blade side of the strip cutter 27 form two sockets. Bolts can be threaded through the sockets and the through holes 272 to screw into the internally threaded holes 261 of the push links 26, such that the strip cutter 27 is locked to the two push links 26 and is moved by the push links 26 to slide in the sliding channel 232.

The lower rail cutter 28 is also a flat member having a front end (that is, an end pointing toward the lower rail of blind to be cut) forming a pointed blade 281 and a rear end provided with a retaining hole 282.

The cutter seat 21 is provided at a side wall with a first oblong slot 211 corresponding to the upper rail cutter 25 and two through holes 212 corresponding to the two push links 26, and at a top and a bottom walls with a second and a third oblong slots 211 corresponding to the lower rail cutter 28.

Figure 3:
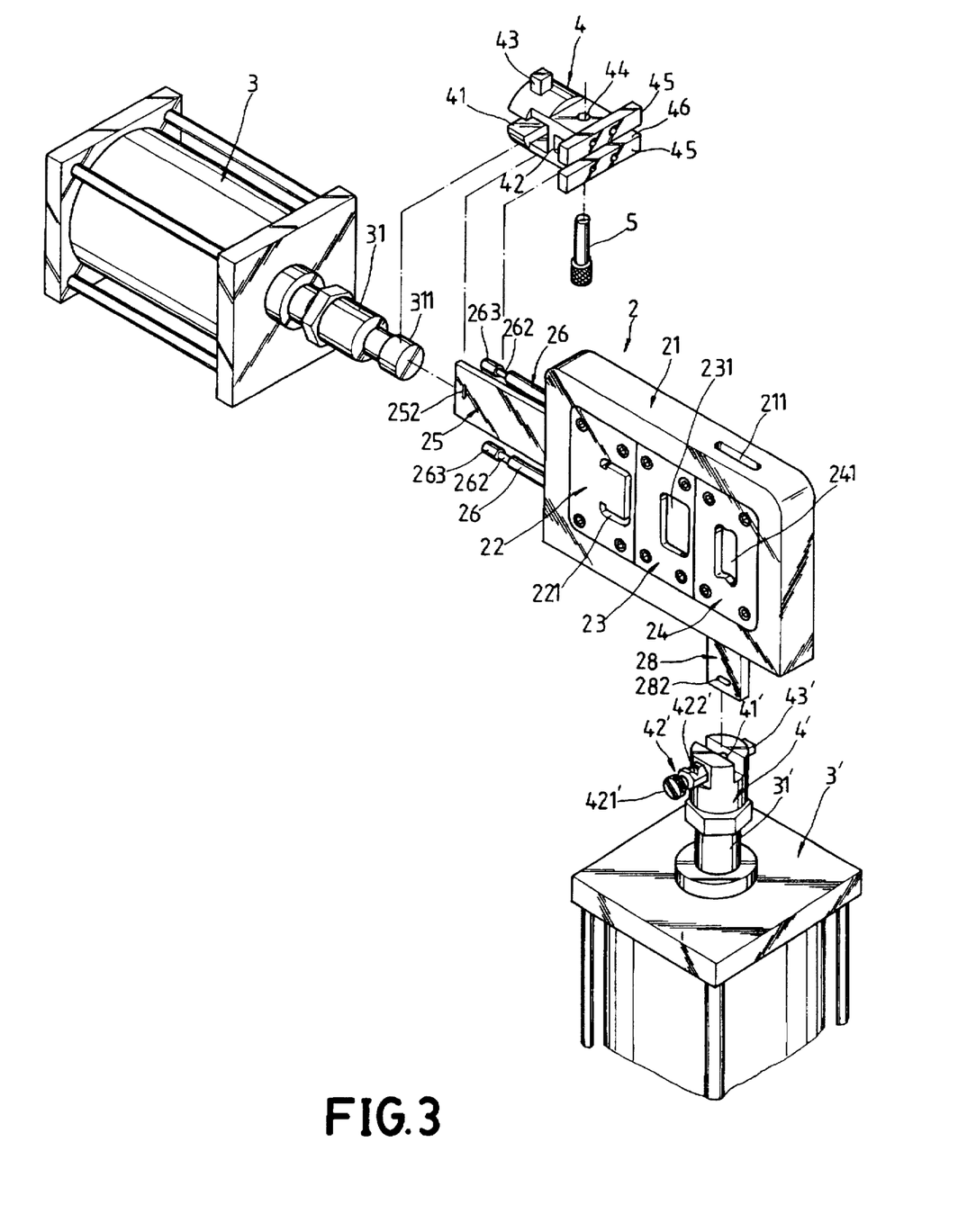
FIG. 3 is an exploded perspective showing the relations between the cutter module, the air cylinders, and the quick couplings of the present invention.
Figure 4:
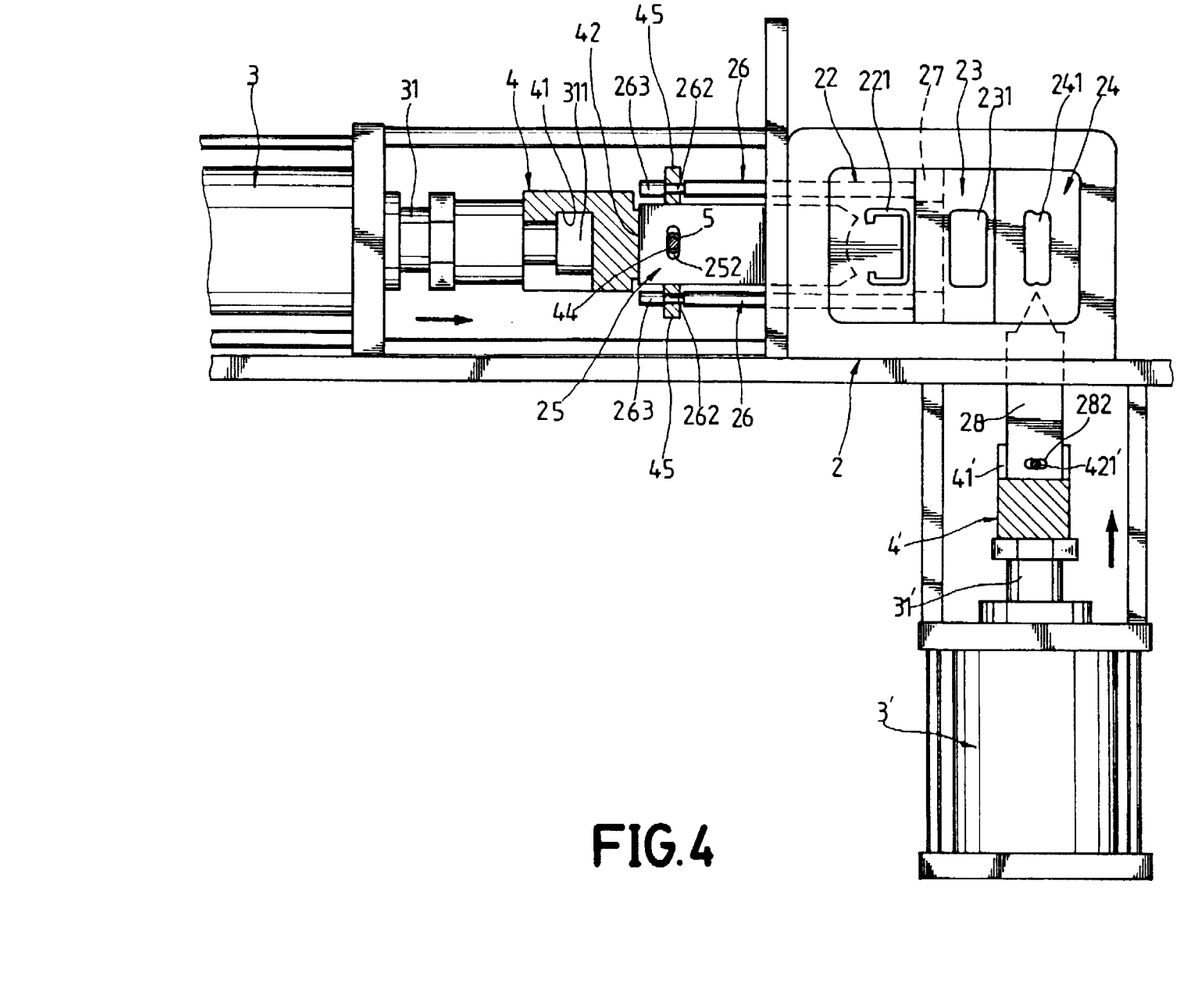
FIG. 4 is a fragmentary elevational view showing the manner in which the cutter module of the present invention is operated.

Please refer to FIG. 3. The first air cylinder 3 is located at a left side of the cutter module 2 (that is, a side near the upper rail cutter 25) and the second air cylinder 3' a bottom side of the cutter module 2. The first air cylinder 3 has a shaft 31 of which an outer end is formed with a retaining head 311 for connecting with the first quick coupling 4.

The first quick coupling 4 is formed at a bottom side with a retaining recess 41 which has a profile corresponding to a shape of the retaining head 311 of the first air cylinder 3, permitting the retaining head 311 to fitly engage into the retaining recess 41, and at a front end (that is, an end facing the upper rail cutter 25) with a receiving recess 42 for receiving the rear end of the upper rail cutter 25 therein. An insertion hole 44 extends across the receiving recess 42 corresponding to the retaining hole 252 at the rear end of the upper rail cutter 25 for an insertion pin 5 to thread through, locking the upper rail cutter 25 to the first quick coupling 4. Two retaining wings 45 are provided to an opening of the receiving recess 42, such that a narrow groove 46 is left between the two wings 45 to just receive the reduced-diameter sections 262 of the push links 26 therein with the stop ends 263 of the push links 26 pressed against a rear side (that is, a side facing the first air cylinder 3) of the wings 45 and be stopped thereat. With these arrangements, the upper rail cutter 25 and the push links 26 are indirectly connected to the shaft 31 of the first air cylinder 3 via the first quick coupling 4 and be driven to slide by the first air cylinder 3. The slide of the push links 26 further drives the strip cutter 27 to slide.

The second air cylinder 3' has a shaft 31' of which a front end (that is, an end facing the lower rail cutter 28) is connected to the second quick coupling 4'. The second quick coupling 4' is formed at a front end (facing the lower rail cutter 28) with a receiving recess 41' for receiving the rear end of the lower rail cutter 28 therein. A quick locating assembly 42' is screwed to one side of the receiving recess 41'. The quick locating assembly 42' includes a retaining rod 421' movably extending across the receiving recess 41' to insert into the retaining hole 282 of the lower rail cutter 28, connecting the lower rail cutter 28 to the second quick coupling 4', and a spring 422' disposed inside the quick locating assembly 42' to press one end thereof against the retaining rod 421', such that the lower rail cutter 28 is indirectly connected to the shaft 31' of the second air cylinder 3' via the second quick coupling 4' and is driven to slide by the second air cylinder 3'. Both the first and the second quick couplings 4 and 4' are provided at one side with a projected block 43 and 43', respectively, to each contact with a limit switch (not shown), in order to control the travel of the shafts 31, 31' of the air cylinders 3, 3', respectively.

Please now refer to FIGS. 1 and 7 at the same time. The blind supporter 6 includes a platform 61 pivotally connected at one edge to the top of the framework 1 in front of the cutter module 2 such that the platform 61 can be folded to the framework when it is not in use or be extended from the framework 1 when it is in use. A hydraulic cylinder 62 is pivotally connected to a bottom side of the platform 61 to control the folding or extension of the platform 61 to or from the framework 1. A first blind holder 63 is slidably mounted within a central area of the platform 61 and is formed at a top with grooves 631, 632, and 633 corresponding to the cutting slots 221, 231, and 241, respectively. A second blind holder 63' is fixedly mounted to an outer side of the cutter seat 21 of the cutter module. The second blind holder 63' is also formed at a top with grooves 631', 632' and 633' corresponding to the cutting slots 221, 231, and 241, respectively. When the blind supporter 6 is in its extended position, the first and the second blind holders 63, 63' together support the venetian blind 8 to be cut thereon with the upper rail 81, the strips 82, and the lower rail 83 separately seated in the grooves 631, 631'; 632, 632'; and 633, 633', permitting the whole venetian blind 8 to be smoothly pushed into the cutter module 2 for cutting.

Figure 5:
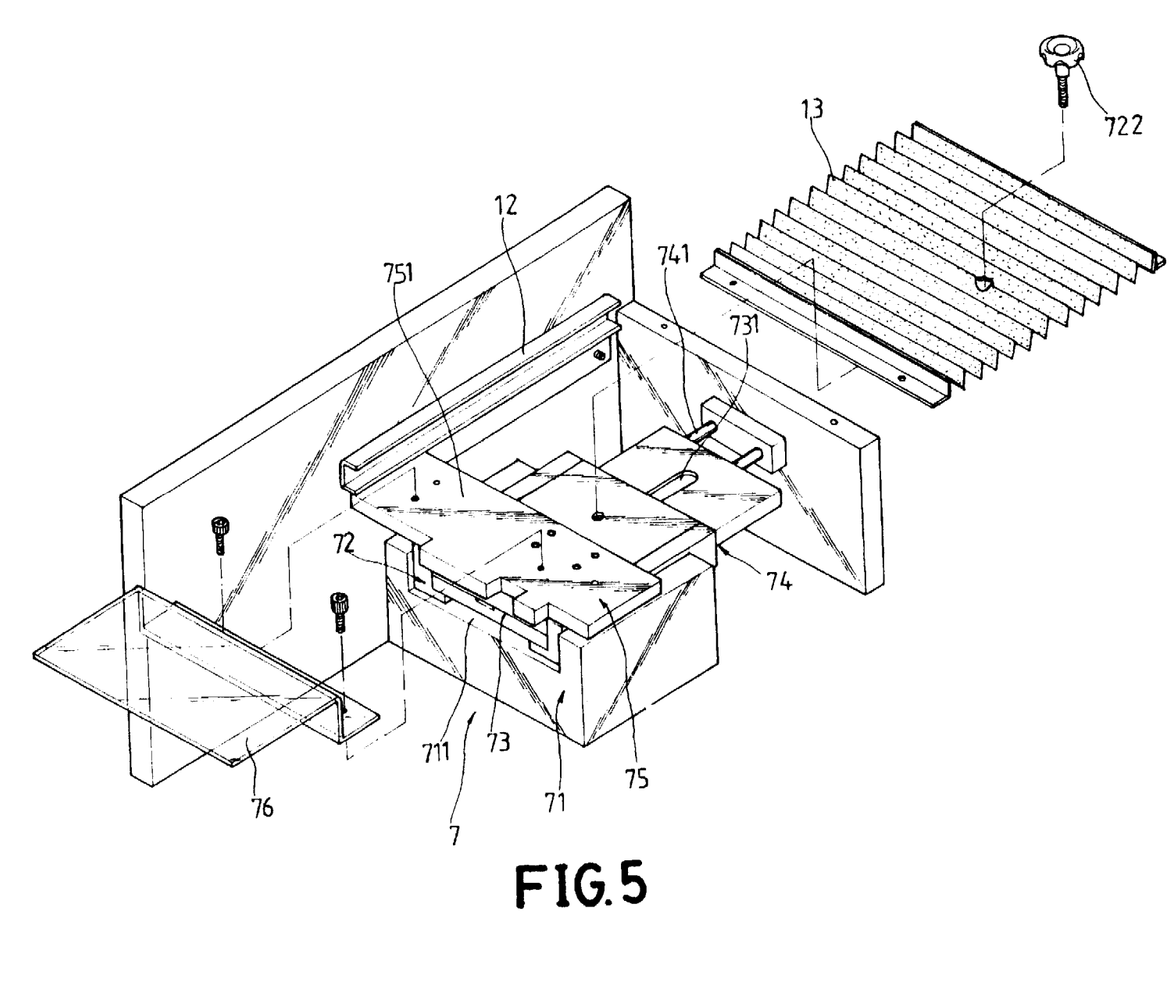
FIG. 5 is a partially exploded perspective of a blind locating assembly adopted in the present invention.

Please refer to FIGS. 1, 5 and 7 at the same time. The blind locating assembly 7 behind the cutter module 2 is contained in a substantially lying U-shaped frame 11 and mainly includes a fixed base 71, a sliding plate 72, a locating plate 73, a third air cylinder 74, a stop plate 75, and a protective cover 76. The fixed base 71 has an upward-facing top sliding recess 711 in which the sliding plate 72 is positioned. The sliding plate 72 has two lateral sides which are bent downward and inward to together define a sliding channel 721 into which the locating plate 73 is disposed, such that the sliding plate 72 slidably moves over and relative to the locating plate 73. An adjusting threaded stem 722 is screwed down into the sliding plate 72. The locating plate 73 is formed at a top surface with an elongated recess 731 for receiving a lower end of the adjusting threaded stem 722 projected from the sliding plate 72. When the adjusting threaded stem 722 is loosened, the sliding plate 72 is allowed to slide over the locating plate 73 to a selected position. When the adjusting threaded stem 722 is tightened, the sliding plate 72 is fixed onto the locating plate 73. The third air cylinder 74 is fixedly connected to a bottom side of the locating plate 73 with two shafts of the cylinder 74 fixedly connected at outer ends to the lying U-shaped frame 11, so that the locating plate 73 is carried by the third air cylinder 74 to move. When the sliding plate 72 is fixed to the locating plate 73 by the tightened adjusting threaded stem 722, it can move along with the moving locating plate 73. The stop plate 75 is fixedly connected to a top of the sliding plate 72 and is formed at a front end (that is, an end facing the cutter module 2) with two forward projected stop blocks 751 for pushing against the cutting end of the venetian blind 8 extended through the cutter module 2. The protective cover 76 is fixedly connected to a top of the stop plate 75 as a security means in cutting operation. Two slide rails 12 are provided to two sides of the lying U-shaped frame 11 for guiding a dust cover 13. The dust cover 13 is covered on top of the whole blind locating assembly 7 to particularly protect the portion of the assembly 7 having the sliding parts from dust. A scale 14 is provided to one side of the frame 11 for conveniently checking the length of a section to be cut from the venetian blind 8.

Figure 6:
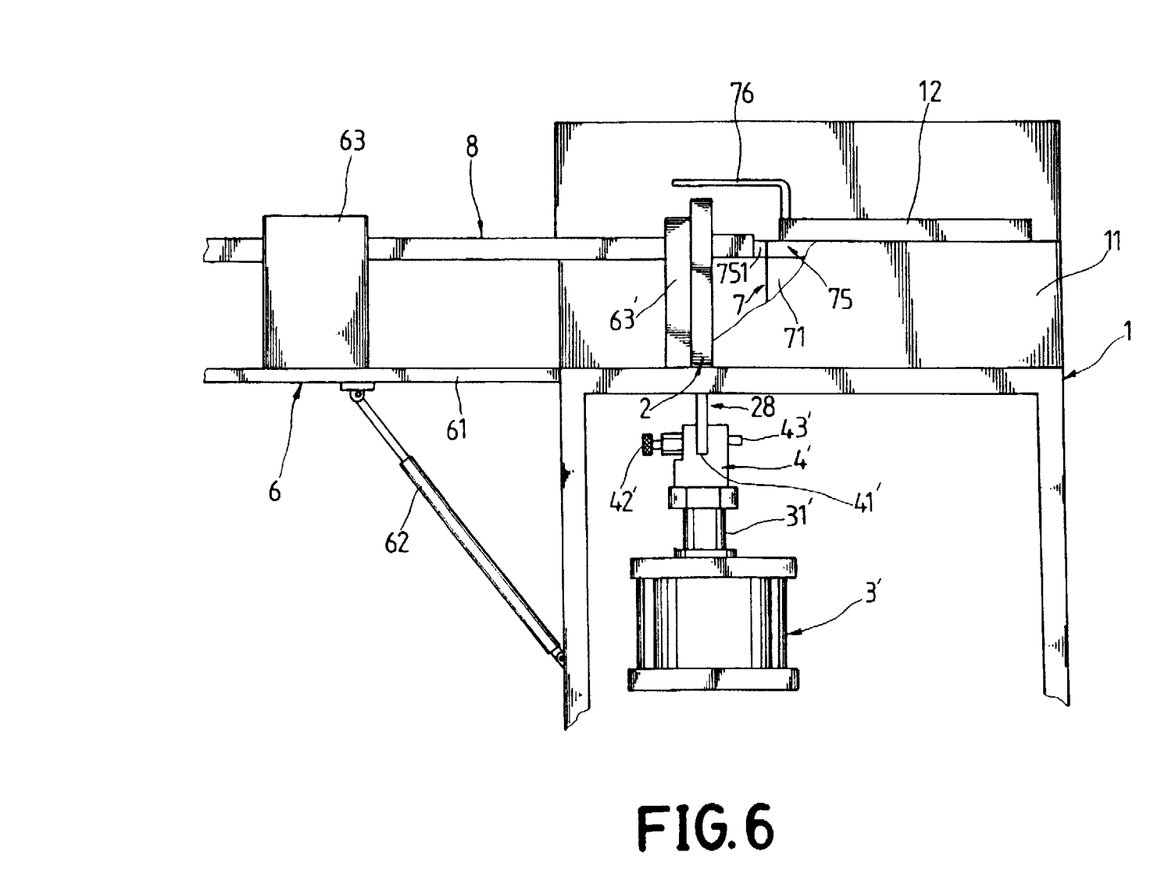
FIG. 6 is a fragmentary side elevational view showing a venetian blind in a cutting position being pressed against at the cutting end and stopped from moving by the blind locating assembly.

To use the cutting machine of the present invention to cut a venetian blind 8, the blind supporter 6 is first extended from the support framework 1 to its operation position with the grooves 631, 631'; 632, 632'; and 633, 633' of the blind holders 63, 63' sequentially supporting the upper rail 81, the strips 82, and the lower rail 83 of the venetian blind 8, so that the upper rail 81, the strips 82 and the lower rail 83 can be accurately pushed into the cutting slots 221, 231, and 241 in the cutter module 2 and moved to the front end of the blind locating assembly 7, as shown in FIG. 7. Loosen the adjusting threaded stem 722, allowing the sliding plate 72 to slide over the locating plate 73 until it reaches a position shown on the scale 14 indicating the length of the venetian blind 8 to be cut. Tighten the adjusting threaded stem 722 to lock the sliding plate 72 against the locating plate 73, allowing the cutting end of the venetian blind 8 to press against the stop blocks 751 of the stop plate 75, as shown in FIG. 6. Switch on the cutting machine to actuate the first and the second air cylinders 3, 3', so that the upper rail cutter 25, the strip cutter 27, and the lower rail cutter 28 indirectly connected to the cylinders 3, 3' via the first and the second quick couplings 4, 4' are pushed by the cylinders 3, 3' to move forward in the cutter module 2 to cut the upper rail 81, the strips 82, and the lower rail 83. At this point, the projected blocks 43, 43' of the quick couplings 4, 4' touch the limit switches (not shown) and causes the cylinders 3, 3' to return to their home positions. When the cylinders 3, 3' return to their home positions, the third air cylinder 74 is actuated at the same time to pull the locked sliding plate 72, locating plate 73, and stop plate 75 backward. At this point, the cutting edge of the venetian blind 8 is no longer pressed by the stop blocks 751, permitting the cut scraps of the blind 8 to fall into a scrap collector or the like (not shown).

When a venetian blind 8 having differently designed rails and/or strips is to be cut with the present invention, simply replace the original cutter module 2 with another suitable one with required cutter slots. The first quick coupling 4 is so designed that its rear retaining recess 41 permits quick connection of the coupling 4 to the shaft 31 of the first air cylinder 3, its front receiving recess 42 and its insertion hole 44 permits quick connection of the coupling to the upper rail cutter 25 simply by an insertion pin 5, and its front wings 45 and narrow groove 46 permits quick connection of the coupling 4 to the push links 26 and accordingly the strip cutter 27. Similarly, the second quick coupling 4' is so designed that its rear end permits quick connection of the coupling 4' to the shaft 31' of the second air cylinder 3', and its front receiving recess 41' and quick locating assembly 42' permits quick connection of the coupling 4' to the lower rail cutter 28. And, to replace a new cutter module 2, simply remove the insertion pin 5 from the insertion hole and move the push links 26 out of the narrow groove 46, the cutter module 2 is disengaged from the quick coupling 4. Then, pull the retaining rod 421' out of the receiving recess 41' and the retaining hole 282, the lower cutter 28 shall immediately disengage from the quick coupling 4'.

What is claimed is:

1. A venetian blind cutting machine, comprising a cutter module, a first and a second air cylinders, a blind supporter, and a blind locating assembly;

said cutter module being mounted on a support framework of said cutting machine and including a cutter seat into which an upper rail cutter holder for receiving an upper rail cutter and two push links, a strip cutter holder for receiving a strip cutter, and a lower rail cutter holder for receiving a lower rail cutter are mounted by screws; said upper rail cutter holder, said strip cutter holder, and said lower rail cutter holder being respectively formed with a cutting slot having a shape the same as a cross section of an upper rail, a strip, and a lower rail of a venetian blind to be cut; said upper rail cutter having an inward curved cutting blade extending through an oblong hole on a side wall of said cutter seat and into said upper rail cutter holder with another end opposite to said cutting blade formed with a retaining hole and projected from said cutter seat; said push link each having a first end connected to said strip cutter which slides in said strip cutter holder and a second end extended through said upper cutter holder and projected out of said cutter seat, said second end of said push link being formed with a stop end and reduced-diameter section behind said stop end; said lower rail cutter having a pointed cutting blade extended through a bottom oblong hole formed on said cutter seat and into said lower rail cutter holder, and another end opposite to said pointed cutting blade being formed with a retaining hole and projected from said cutter seat;

said first air cylinder being located at a left side of said cutter module and having a shaft for connecting with a first quick coupling, said first quick coupling being formed at a bottom side with a retaining recess which has a profile corresponding to a shape of a retaining head of said shaft for quickly connecting to said first air cylinder, and at an end facing said cutter seat with a receiving recess, said receiving recess having an insertion hole extended there across and two retaining wings extended along two sides of an opening of said receiving recess to define a narrow groove between said two wings for receiving said projected end of said upper rail cutter in said receiving recess and said stop ends of said push links behind said retaining wings, whereby, when an insertion pin is inserted into said insertion hole on said first quick coupling and through said retaining hole on said upper rail cutter, said upper rail cutter is connected to said first quick coupling, and when said push links are retained by said retaining wings with said reduced-diameter sections located in said narrow groove between said retaining wings, said strip cutter connected to said push links is also connected to said first quick coupling, whereby both of said upper rail cutter and said strip cutter are quickly but indirectly connected to and driven by said shaft of said first air cylinder to slide in said cutter seat; said second air cylinder being located at a bottom of said cutter module and having a shaft connected to a second quick coupling, said second quick coupling having an end facing said cutter seat being formed with a receiving recess for receiving said projected end of said lower rail cutter therein, said receiving recess of said second quick coupling having a quick locating assembly screwed to one side thereof, said quick locating assembly including a retaining rod movably extending across said receiving recess to insert into said retaining hole formed on said lower rail cutter to connect said lower rail cutter to said second quick coupling and accordingly to said second air cylinder, and a spring disposed inside said retaining rod, whereby said lower rail cutter is quickly connected to and driven by said second air cylinder to slide in said cutter seat;

said blind supporter including a platform pivotally connected at one edge to the top of said support framework and driven by a hydraulic cylinder to pivotally turn away from said support framework into an operation position; a first blind holder being movably mounted on said platform and formed at a top with grooves corresponding to said cutting slots in said upper rail cutter, said strip cutter, and said lower rail cutter, whereby an upper rail, strips, and a lower rail of said venetian blind to be cut can be stably supported on said first blind holders; and said blind locating assembly being located behind said cutter module and being mounted in a lying U-shaped frame fixed to said support framework, said blind locating assembly including a fixed base, a sliding plate, a locating plate, a third air cylinder, a stop plate, a protective cover, and a dust cover; said fixed base having an upward-facing top sliding recess for positioning said sliding plate, said sliding plate having two lateral sides bent downward and inward to define a sliding channel into which said locating plate is disposed, such that said sliding plate slidably moves over said locating plate; said blind locating assembly also including an adjusting threaded stem screwed down into said sliding plate to press against a recess formed on said locating plate, whereby when said adjusting threaded stem is loosened, said sliding plate is allowed to slide on said locating plate to a desired position indicating a length to be cut from said venetian blind; said third air cylinder being connected to a bottom side of said locating plate with shafts thereof fixedly connected to said lying U-shaped frame, so that said locating plate and said sliding plate locked to said locating plate by said adjusting threaded stem are carried by said third air cylinder to move back and forth; said stop plate being fixed to a top of said sliding plate and having two forward projected stop blocks to press against a cutting edge of said venetian blind to be cut extended through said cutter module and into said blind locating assembly; said third air cylinder being actuated to carry said locating, said sliding, and said stop plates to move backward when said venetian blind is cut, allowing cut scraps to fall into a collector; said protective cover being connected to a top of said stop plate as a security means in cutting operation, and said dust cover being covered on top of said blind locating assembly to prevent dust from coming into said assembly.

2. A venetian blind cutting machine as claimed in claim 1, wherein a second blind holder corresponding to said first blind holder is mounted in front of said cutter module to cooperate with said first blind holder to more stably support said venetian blind to be cut.

* * * * *